Patented Mar. 27, 1923.

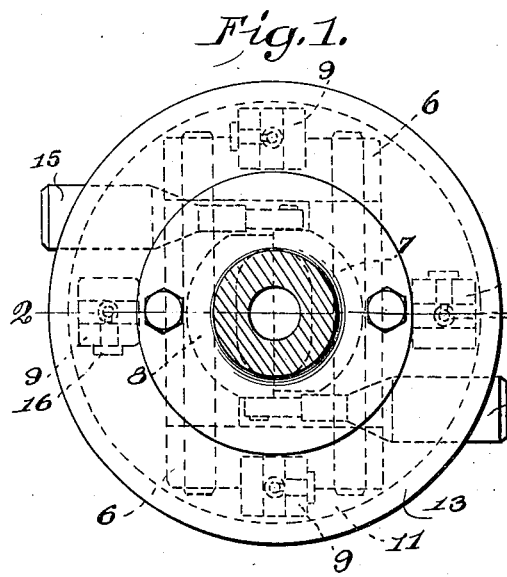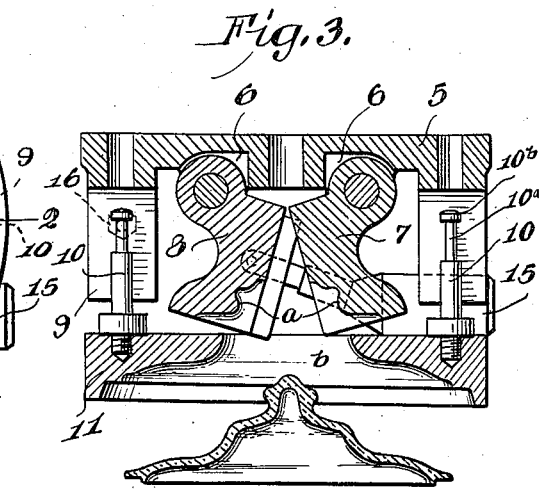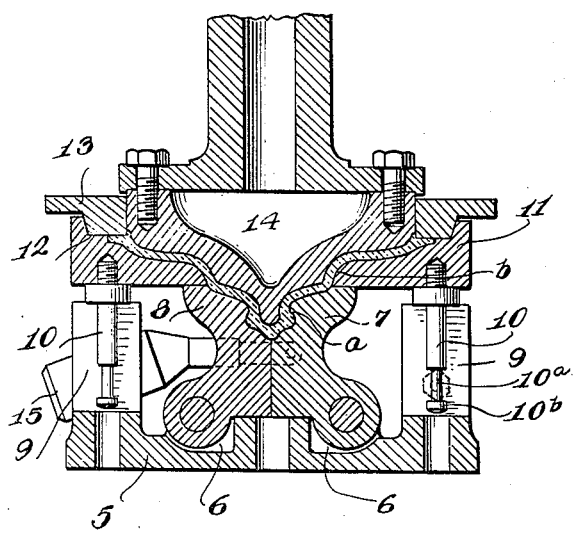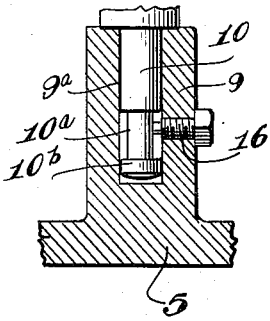

1,449,808

UNITED STATES PATENT OFFICE.

HARRY R. BOALS, OF CORNING, NEW YORK, ASSIGNOR TO CORNING GLASS WORKS, OF CORNING, NEW YORK, A CORPORATION OF NEW YORK.

MOLD.

Application filed November 8, 1921. Serial No. 513,745.

*To all whom it may concern:*

Be it known that I, HARRY R. BOALS, a citizen of the United States of America, residing at Corning, in the county of Steuben and State of New York, have invented a new and useful Mold, of which the following is a specification.

My invention relates to molds for pressing glass or other articles and particularly articles having an integral knob or projection connected therewith by a restricted neck. It is especially useful in making pressed glass covers for dishes having a knob or projecting handle As has been well known, molds for pressing glassware consist of a bottom portion formed in one or more parts, having the desired contours of the article to be made; a plunger and a plunger ring interposed between the bottom portion and the plunger through which the plunger passes. My invention provides simple, expeditious and automatic means for removing ware having a restricted neck from the mold and for again making the mold ready for use.

I am aware that heretofore molds have been used consisting of several sections movable toward and away from each other, which parts are opened or separated by hand or by such mechanisms as cams and springs. I am also aware that molds consisting of hinged parts have been constructed from which the finished article is discharged by the action of gravity, operating after a manual or mechanical release of a locking device in such molds. In order to prepare the same for a further charge, a manual or mechanical interposition is required to lock such mold.

In my invention, the finished article is discharged by the simple inversion of the mold which is again prepared for further use by a return to the upright position.

Referring to the accompanying drawings:—

Figure 1, is a plan view of a mold constructed in accordance with my invention;

Fig. 2, is a vertical section thereof taken on line 2—2 of Fig. 1;

Fig. 3, is a view in section showing the manner in which the pressed ware is removed from the mold, and Fig. 4, is a vertical section of one of the bosses 9 and guide pins 10 of Fig. 2.

My invention comprises a base 5 having a pair of integrally formed ears 6 to each of which is pivoted one of a pair of sectional auxiliary mold members 7 and 8, similar in form which, when closed, provide a cavity *a*, for forming the knob or projection and the restricted neck. Each of these sections 7 and 8 is provided with a weight 15 so positioned as to assist parts 7 and 8 in opening and closing upon inversion and return of the mold as hereinafter described.

The weights 15 are so constructed that upon inversion of the mold, they strike the main mold 11, arresting the opening motion of the auxiliary mold parts, and thus prevent the center of gravity of the auxiliary mold to which it is attached, from reaching the vertical line passing through its pivot, and preventing injury to the main and auxiliary molds.

Arising from the base 5 are bosses 9 in radial slots of which are contained guide pins 10 projecting downwardly from the main or ring mold 11 which has a cavity *b* so registering with cavity *a* of the assembled auxiliary mold parts 7 and 8 as to form the desired exterior contour of the article to be molded.

As shown in Fig. 4, the guide pins are provided with reduced portions 10ª which form cavities into which the ends of set-screws 16 project, limiting the sliding action of pins 10.

The main mold 11 is provided with ring seat 12 upon which rests a removable plunger ring 13 through which passes a plunger 14 of such contour as to form the desired internal contour of the article to be pressed.

When in upright position (Figure 2), parts 7 and 8 are closed by weights 15. Main mold 11 is seated upon the upward faces of parts 7 and 8 and cavities *a* and *b* register. When the mold is charged with glass, the plunger ring 13 is seated upon ring seat 12, and plunger 14, passing through ring 13, is pressed downward to form the desired article.

The parts are so assembled that the pivots between the auxiliary mold parts 7 and 8 and the base 5 are located sufficiently away from the meeting plane of the auxiliary mold sections that such parts are prevented from opening during the pressing operation by the seating of the main mold upon the upper surface of the auxiliary mold parts. This location of the pivots in question tends to throw the center of gravity of each auxiliary mold section, with respect to its pivot, in the direction of the opposite mold section, and tends to close the molds when in normally erect position, and open them when vertical. To insure this opening and closing without necessitating abnormal separation of the pivots and undue size of the device as a whole, the weights 15 are provided.

After the formation and setting of the article, the plunger 14 and ring 13 are raised, and the mold inverted by means of suitable handles (not shown). The main mold drops away from the base guided by guide pins 10 to the limit set by screws 16, parts 7 and 8 assisted by weights 15 separate or open, and the article falls from the mold.

Upon return to the upright position, parts 7 and 8 again assisted by weights 15, assemble. The main mold 11 of its own weight, slides back in contact therewith, and the mold is ready for a further charge.

Having fully described my invention what I claim as new, and desire to secure by Letters Patent is:—

1. The combination of the structure of the class described of a main mold body, co-operating sectional pivoted auxiliary mold portions having relative movement in respect to the main body, and means for limiting the movement of the main and auxiliary mold portions to and from each other, the pivots of the auxiliary portions being located outside of the meeting plane of the auxiliary mold portions, and below the meeting plane of the body mold and auxiliary mold portions when the mold is in pressing position, whereby said auxiliary mold portions are locked in respect to each other by the seating thereon of the main portion in pressing.

2. A mold having a base, a plurality of auxiliary mold members pivoted thereon, and a main mold slidably mounted upon such base to and from the auxiliary mold members, the pivots of the auxiliary mold members being outside of the joint between said auxiliary mold members and, when the mold is in pressing position being below the joint between the main mold and the auxiliary mold members.

3. A mold having a base, a plurality of auxiliary mold members pivoted thereon, and a main mold slidably mounted upon such base to and from the auxiliary mold members, the pivots of the auxiliary mold members being outside of the joint between the auxiliary mold members and when the mold is in pressing position being below the joint between the main mold and the auxiliary mold members, the centers of gravity of each of said auxiliary mold members being off-set with respect to its pivot in the direction of the other auxiliary mold member.

In testimony whereof, I, hereunto, affix my signature this 7 day of November 1921.

HARRY R. BOALS.